Dec. 4, 1956  R. GOLZE  2,772,940
AUTOMATIC RECORDING DEVICE FOR MANEUVERING SHIPS
Filed Oct. 28, 1953  4 Sheets-Sheet 1
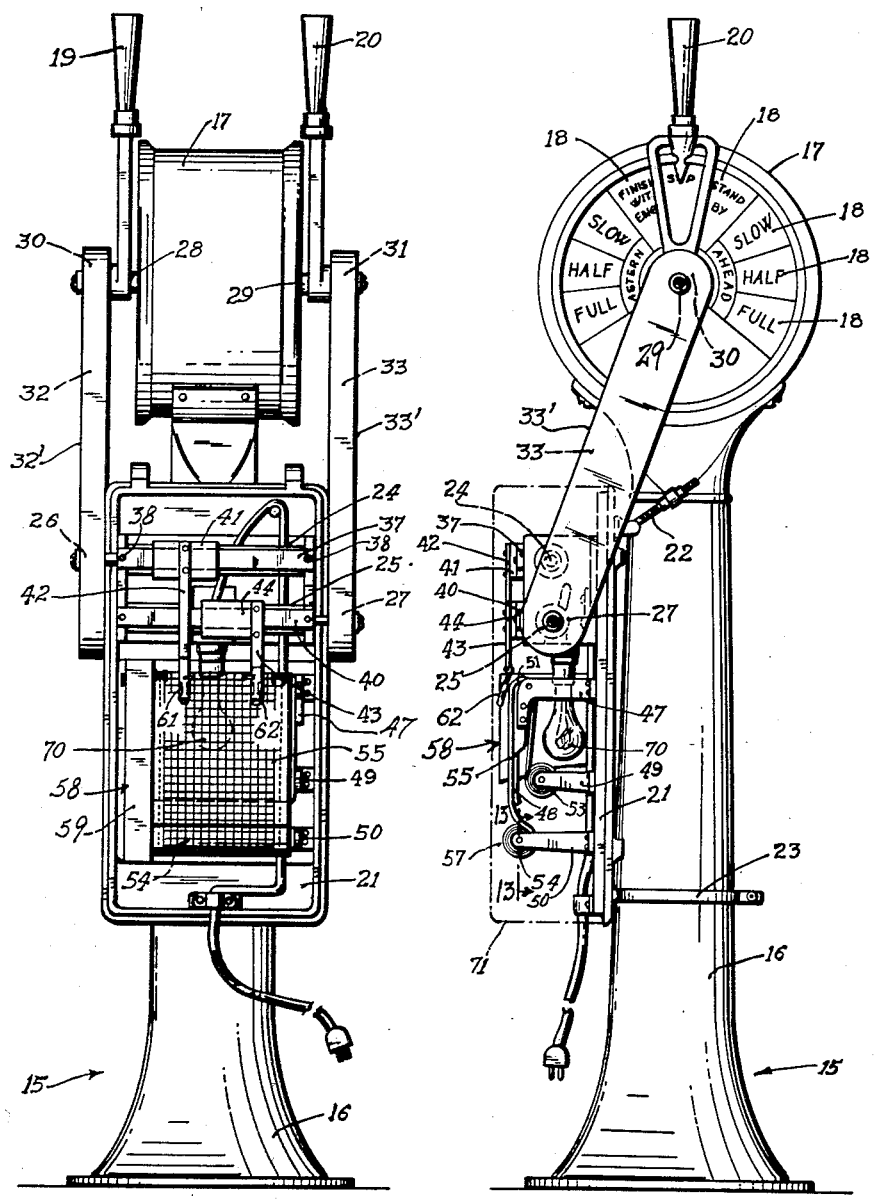
INVENTOR.
RICHARD GOLZE
BY
ATTORNEY Dec. 4, 1956 R. GOLZE 2,772,940
AUTOMATIC RECORDING DEVICE FOR MANEUVERING SHIPS
Filed Oct. 28, 1953 4 Sheets-Sheet 2
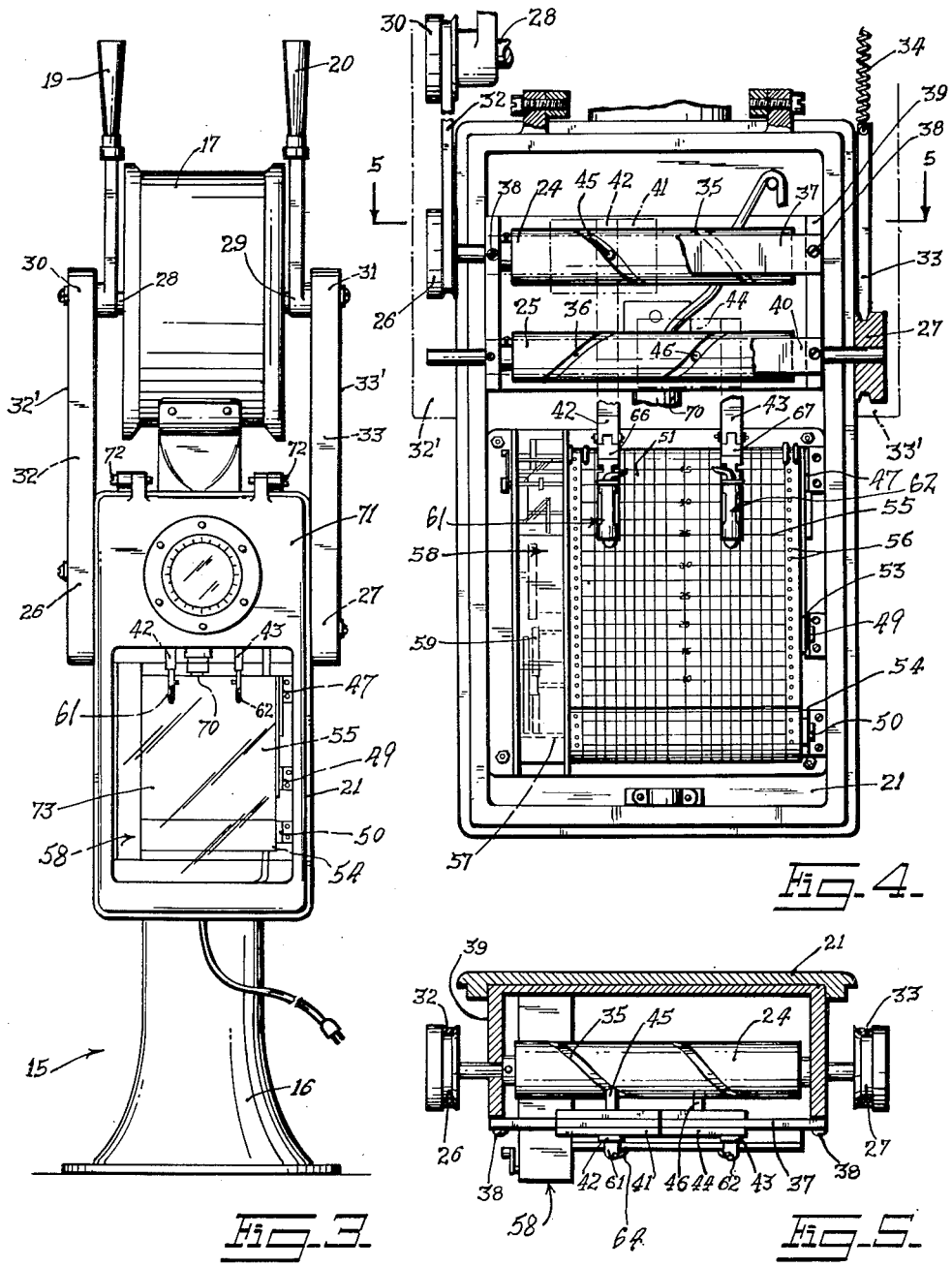
INVENTOR.
RICHARD GOLZE
BY
ATTORNEY Dec. 4, 1956 R. GOLZE 2,772,940
AUTOMATIC RECORDING DEVICE FOR MANEUVERING SHIPS
Filed Oct. 28, 1953 4 Sheets-Sheet 3
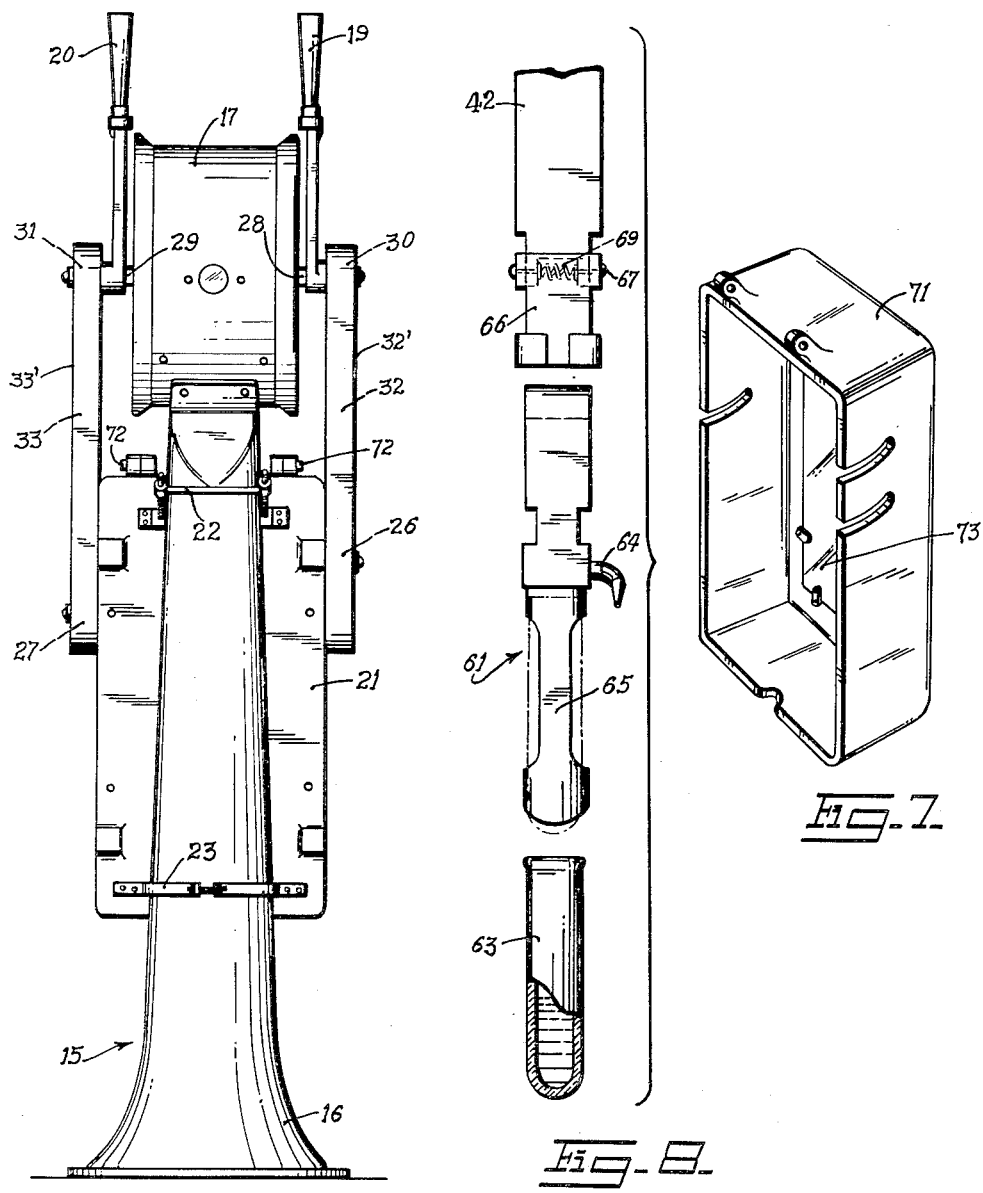
INVENTOR.
RICHARD GOLZE
BY
ATTORNEY

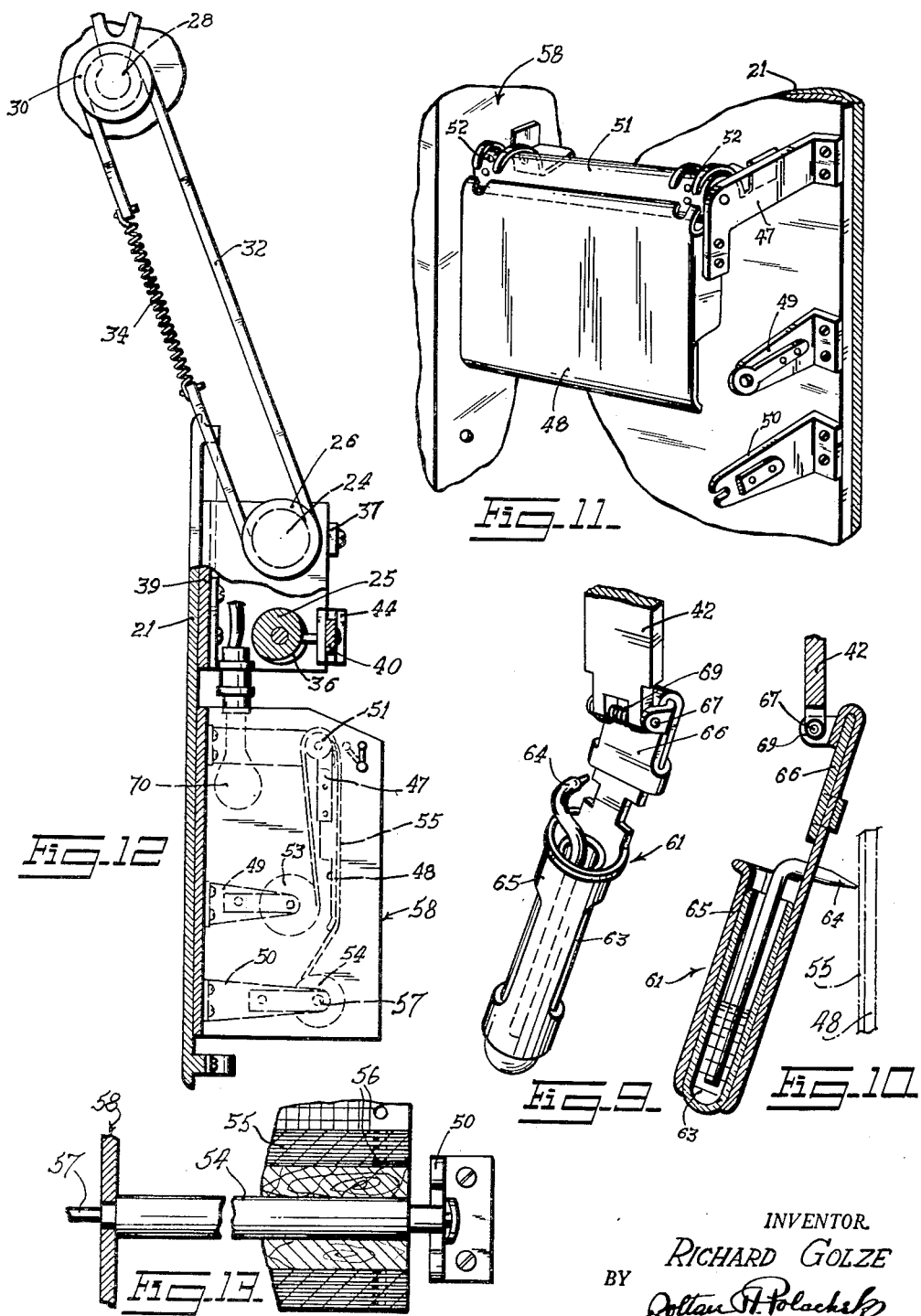

United States Patent Office 2,772,940
Patented Dec. 4, 1956

2,772,940

AUTOMATIC RECORDING DEVICE FOR MANEUVERING SHIPS

Richard Golze, Staten Island, N. Y.

Application October 28, 1953, Serial No. 388,759

1 Claim. (Cl. 346—8)

This invention relates to new and useful improvements in recording devices for ship telegraphs used in sending engine instructions from the bridge to the engine room.

More particularly, the present invention proposes the construction of an improved ship telegraph recorder for permanently recording positions and movements of a pivotally mounted bridge-to-engine room telegraph lever of the type commonly found on ship telegraphs.

Another object of the present invention proposes forming the recorder with rotatable shafts connected by belts with the two levers of a two engine ship telegraph, the rotatable shafts having stylus guide means thereon each to guide a stylus over a clock-moved recording strip and indicate the positions and movements of the two levers.

Still further, the present invention proposes constructing the recorder with styluses, stylographs or other marking instruments removably mounted on the recorder in a novel manner so they can readily be removed and will firmly bear against the recording strip at all times.

As a further object, the present invention further proposes a stylus or stylograph construction which will permit an ample supply of marking fluid to be held and will feed it to the point of the instrument in a steady flow as needed.

The present invention further proposes constructing the recorder with a housing having a transparent window therein for convenient observation of the recording instrument and with illumination means in the housing for clear observation.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a side view of a twin engine ship telegraph with the recorder of the present invention mounted thereon, the cover of the recorder housing having been removed.

Fig. 2 is a front view of the telegraph and recorder shown in Fig. 1.

Fig. 3 is a view similar to Fig. 1 but with the housing cover in place.

Fig. 4 is an elarged view of the recorder with the housing cover removed.

Fig. 5 is a sectional view taken on lines 5—5 of Fig. 4.

Fig. 6 is a view similar to Figs. 1 and 3, but showing the other side.

Fig. 7 is a perspective view of the recorder housing cover.

Fig. 8 is an exploded view of the stylus, stylograph or writing instrument and associated parts.

Fig. 9 is an assembled perspective view of the parts shown in Fig. 8.

Fig. 10 is a vertical sectional view of the structure shown in Fig. 9.

Fig. 11 is a detail perspective fragmentary view of parts of the recorder housing and the backing plate for the recording material.

Fig. 12 is a side view of the recorder with parts broken away and in section.

Fig. 13 is an enlarged detail view, partly in section, taken on line 13—13 of Fig. 2.

Referring more particularly to the drawings, the new recorder is shown mounted on the usual ship telegraph 15. The ship telegraph shown in the several figures is that for a two-engine ship, but it will be obvious that the recorder may be used on a single engine ship telegraph.

Ship telegraph 15 has a stand 16 on which is mounted a dial drum 17 containing the engine directions 18 (see Fig. 2). Telegraph levers 19 and 20 are pivotally mounted on the drum 17 for movement across its respective faces.

The recorder has a frame or housing 21 which is mounted on the telegraph stand 16 by brackets 22 and 23 (see Fig. 2 and Fig. 6) just under the drum 17.

A shaft 24 is rotatably mounted in the housing 21 extending across it and adjacent the top of the housing. A similar shaft 25 is similarly mounted in the housing 21 below and spaced from the shaft 24. Each shaft has an end portion extending from alternate sides of the housing, and a pulley wheel 26 is mounted on this end of shaft 24 while a similar pulley wheel 27 is mounted in a like manner on shaft 25.

Telegraph levers 19 and 20 are mounted on stub shafts 28 and 29, respectively, which stub shafts extend into the drum 17 of the telegraph. Pulley wheels 30 and 31 are mounted on the stub shafts 28 and 29, respectively. A belt 32 extends between the pulley wheels 30 and 26 connecting the shaft 24 with the telegraph lever 19 for movement therewith. A belt 33 between pulley wheels 31 and 27 similarly connects the shaft 25 with the telegraph lever 20. Belts 32 and 33 both have a spring 34 to maintain them in tightened position on the pulley wheels (see Fig. 12). The belts 32 and 33 are covered by protector shields 32′ and 33′.

Shaft 24 contains peripheral guide means in the form of a spiral groove 35 and shaft 25 has a similar groove 36 but spiraled in the opposite direction (see Figs. 4 and 5).

A guide bar 37 is mounted in the housing 21 parallel to the shaft 24 and disposed in front of it, the guide bar 37 being removably fastened by screws 38 (Fig. 5) to a bracket 39 fixed to the housing 21. A similar guide bar 40 is similarly mounted in the housing 21 parallel to the shaft 25 and disposed in front of it.

Slidably mounted on the guide bar 37 by blocks 41 is a stylus support bar 42, and a similar bar 43 is similarly mounted on guide bar 40 by blocks 44, the stylus support bar 43, however, being shorter in length than the stylus support bar 42.

A guide pin 45 (Figs. 4 and 5) extends from the stylus support bar 42 into the spiral groove 35 of the shaft 24 and a guide pin 46 extends from the stylus support bar 43 into the spiral groove 36 of the shaft 25 so that rotation of the shafts results in the stylus support bars 42 and 43 being slid laterally on their respective guide bars 37 and 40.

Mounted in the housing 21 on a bracket 47 (see Fig. 11), is a backing plate 48, preferably of thin translucent material (see Fig. 11). Also mounted in the housing 21 are brackets 49 and 50. The bracket 47 and the housing 21 supports a guide roller 51 having spaced teeth 52 at each end thereof. Brackets 49 and 50 together with housing 21 support rolls 53 and 54, respectively, from which and onto which recording material in the form of chart paper 55 is wound. The chart paper 55 contains guide perforations 56 at its side edges to engage the teeth 52 on the guide roller 51, the paper 55 being threaded over the roller 51 and over the backing plate 48 onto the roll 54.

Roll 54 removably fits into a roll turning member 57 which is driven by a clock movement 58 through gearing 59 (see Fig. 4). In this manner, the backing plate 48 is mounted in the housing 21 behind a portion of the recording material 55 for movement of the recording material across it by the clock movement 58 in a progressive time movement. The chart paper 55 has time markings 60 calibrated along its length to correspond with its time movement, and dates may be printed or stamped on it as well.

A stylus 61 and a stylus 62 are movably mounted in the housing 21 as will now be described. By the term "stylus" it is meant to include any type marking instrument but more particularly a stylograph or other type marking instrument having a point and fed with ink.

Stylus 61 and stylus 62 are constructed identically. Each has a stylus ink reservoir 63 of transparent material in the form of a tube with a closed end and an open end (see Figs. 9 and 10). Each also is in the form of a hollow tube having one end adapted to extend into the ink reservoir 63 and the other end 64 being goose-necked and pointed and adapted to extend from the ink reservoir. Each stylus has an ink reservoir holder 65 removably to hold the ink reservoir. The upper end of each holder 65 is curved to clip onto a spring clip. Stylus 61 clips onto a spring clip 66 which is pivotally secured to stylus support bar 42 by pin 67 and stylus 62 clips onto a spring clip 68 similarly secured to stylus support bar 43. Springs 69 on the spring clips 66 and 68 bias the stylus points toward the backing plate 48 and against the recording material passing across the plate.

An electric lamp 70 is mounted in the housing 21 behind the backing plate 48 for illumination. The housing 21 has a cover 71 removably and pivotally mounted on the front of the casing by hinge pins 72. Cover 71 has a transparent portion or window 73 adjacent the styluses.

To operate the recorder, the user starts the clock movement which feeds the recording material across the backing plate and the styluses mark thereon the position of the telegraph levers. When the levers are moved, the styluses record this movement and the new position of the telegraph levers. From the time calibrations on the recording material it can be readily seen where the levers stood at any given time and the time when movement of the levers occurred, as well as what that movement was. Thus a permanent record can be made of the "orders" from the bridge to the engine room of a ship.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

In automatic recording apparatus for maneuvering ships, a housing, a chart therein, a transverse guide bar supported in the housing, a bar dependent from and slidable along said guide bar, said slidable bar having a bifurcated end with openings in its bifurcations, means for sliding said dependent bar, and a stylus recording device carried by said slidable bar, said device consisting of a tubular ink reservoir closed at one end and open at the other end, a tubular holder for said reservoir, a plate extension on said holder, a hook on the end of said plate extension, a plate hingedly connecting the plate extension and the bifurcated end of the sliding bar, said connecting plate having opposed perforated ears at one end disposed in alignment with the bifurcations on the end of the sliding bar, the upper end of the plate extension being hooked over the upper end of said connecting plate between said perforated ears, spring clips on the other end of the connecting plate encircling said extension plate, a shaft extending through the aligned openings and perforations in the bifurcations and perforated ears, respectively, a goose-neck tubular scribing element supported in the tubular ink reservoir and extending outwardly through the open end thereof, and a spring coil on the shaft normally urging the tubular holder so that the scribing element engages the chart in operative position.

References Cited in the file of this patent

UNITED STATES PATENTS

| | | |
|---|---|---|
| 991,585 | Wilson et al. | May 9, 1911 |
| 994,678 | Hennah et al. | June 6, 1911 |
| 1,815,389 | Wolf | July 21, 1931 |
| 1,850,978 | Sperry | Mar. 22, 1932 |
| 2,202,547 | Bushnell | May 28, 1940 |
| 2,321,273 | Belcher | June 8, 1943 |
| 2,596,305 | Stevens | May 13, 1952 |